(12) United States Patent
Chen

(10) Patent No.: US 11,167,589 B1
(45) Date of Patent: Nov. 9, 2021

(54) BICYCLE HUB STRUCTURE

(71) Applicant: CHOSEN CO., LTD., Chang Hua Hsien (TW)

(72) Inventor: Ching-Shu Chen, Changhua (TW)

(73) Assignee: CHOSEN CO., LTD., Chang Hua Hsien (TW)

( * ) Notice: Subject to any disclaimer, the term of this patent is extended or adjusted under 35 U.S.C. 154(b) by 0 days.

(21) Appl. No.: 16/920,726

(22) Filed: Jul. 5, 2020

(51) Int. Cl.
*B60B 27/02* (2006.01)
*F16D 41/24* (2006.01)

(52) U.S. Cl.
CPC ............ *B60B 27/023* (2013.01); *F16D 41/24* (2013.01)

(58) Field of Classification Search
CPC .............................. B06B 27/023; F16D 41/24
See application file for complete search history.

(56) References Cited

U.S. PATENT DOCUMENTS 10,119,579 B2 * 11/2018 Gerhardt ................. F16D 41/28

FOREIGN PATENT DOCUMENTS

CN     210139747        3/2020
FR     2776569 A1 * 10/1999 ........... B60B 27/023

OTHER PUBLICATIONS

EspaceNet Abstract for CN210139747.

* cited by examiner

*Primary Examiner* — Charles A Fox
*Assistant Examiner* — Jessica L Burkman

(57) ABSTRACT

A bicycle hub structure has a hub member, a clutch set, a driving base and a sleeve. The thread angle of the outer threaded section of the driving base is greater than the thread angle of the inner threaded section of the driving central shaft, so that the driving central shaft and the external toothed coupling collar have a coupling state instantly which greatly reduces the actuation stroke of the clutch set, improves the smoothness of driving and the sensitivity of the hub member.

8 Claims, 10 Drawing Sheets

A-A

B-B

BICYCLE HUB STRUCTURE

BACKGROUND OF INVENTION

Field of Invention

The present invention relates to a bicycle hub structure, and more particularly to a bicycle hub structure with a different clutch structure.

Description of Related Art

Currently, Chinese application CN210139747U discloses a bicycle wheel hub with an inclined surface abutting driving body, which comprises a wheel hub body, a driven piece and a transmission assembly; the driven piece and the transmission assembly form an abutting state through two inclined surfaces for transmitting torsion, so that the wheel hub body rotates, and the sensitivity of the rotation of the wheel hub body is improved.

However, the above conventional structure still has some shortcomings: the driven piece, the transmission assembly and the mandrel of the conventional structure are installed in the wheel hub body, because the elastic stroke of the spring is long, it is causes the increase of the clutch stroke, and the clutch process of the driven piece cannot be completed quickly. Therefore, it is desirable to provide a bicycle hub structure to mitigate and/or obviate the aforementioned problems.

SUMMARY OF INVENTION

An objective of present invention is to provide a bicycle hub structure, which is capable of improving the above-mention problems.

In order to achieve the above mentioned objective, a bicycle hub structure has a hub member, a clutch set, a driving base and a sleeve. The hub member has a chamber and a mandrel passing through the chamber, and a fiber reinforced polymer baffle, a support base and an internal toothed collar are mounted in the chamber. The support base is slidingly engaged with the mandrel and pushes against the fiber reinforced polymer. An outer periphery of the internal toothed collar engages with an inner wall of the chamber and comprises a plurality of internal teeth on an inner periphery thereof. The clutch set comprises a driving central shaft and an external toothed coupling collar. The external toothed coupling collar comprises an inclined section internally engaging with the tapered abutment surface of the driving central shaft. The external toothed coupling collar has a plurality of external teeth engaging with the internal teeth of the internal toothed collar. The driving base comprising an axial hole configured to jacket onto the mandrel, and the axial hole further has at least two bearing members jacketed onto the mandrel. The driving base has an outer threaded section, an engaging section, a stopping ring, and an engaging protrusion, a beveled bearing, the C-shaped buckle. The engaging section is jacketed by the beveled bearing and positioned by the stopping ring. The driving base is disposed in the chamber of the hub member, and an outer periphery of the beveled bearing engages an inner periphery of the chamber. The outer threaded section engages with the inner threaded section of the driving central shaft, and the C-shaped buckle pushes against the beveled bearing and fastening with the inner periphery of the chamber.

Other objects, advantages, and novel features of invention will become more apparent from the following detailed description when taken in conjunction with the accompanying drawings.

DETAILED DESCRIPTION OF PREFERRED EMBODIMENT

Figure 1:
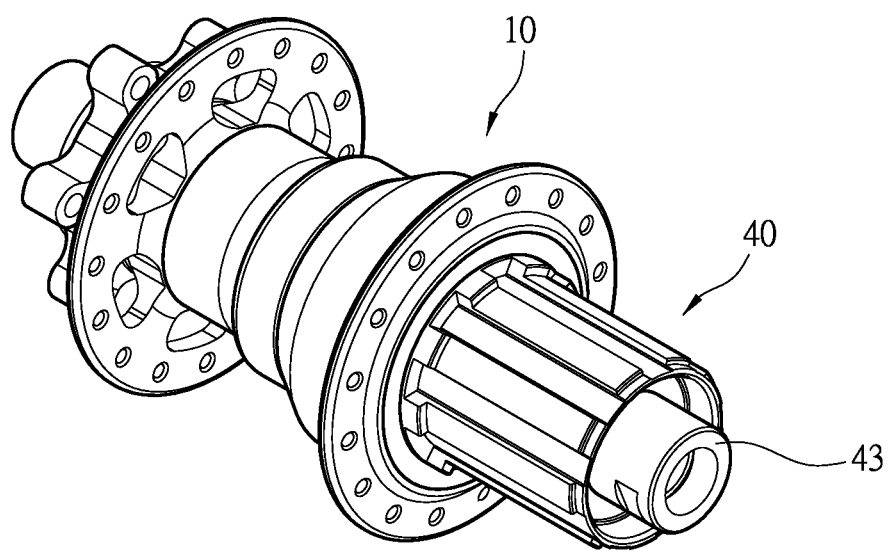
FIG. 1 is a perspective view of in accordance a preferred embodiment of the present invention.
Figure 2:
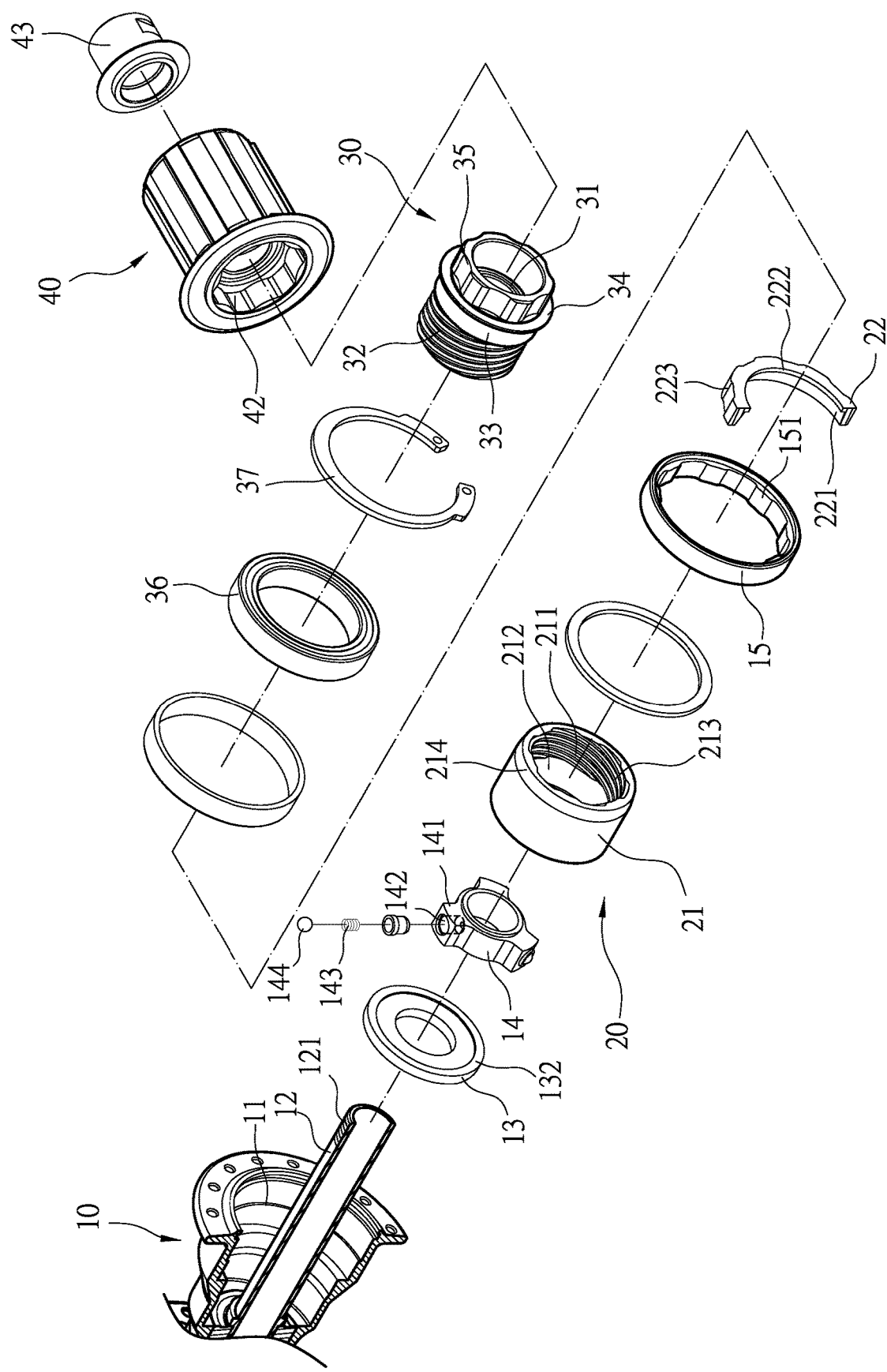
FIG. 2 is an exploded view in accordance the preferred embodiment of the present invention.
Figure 3:
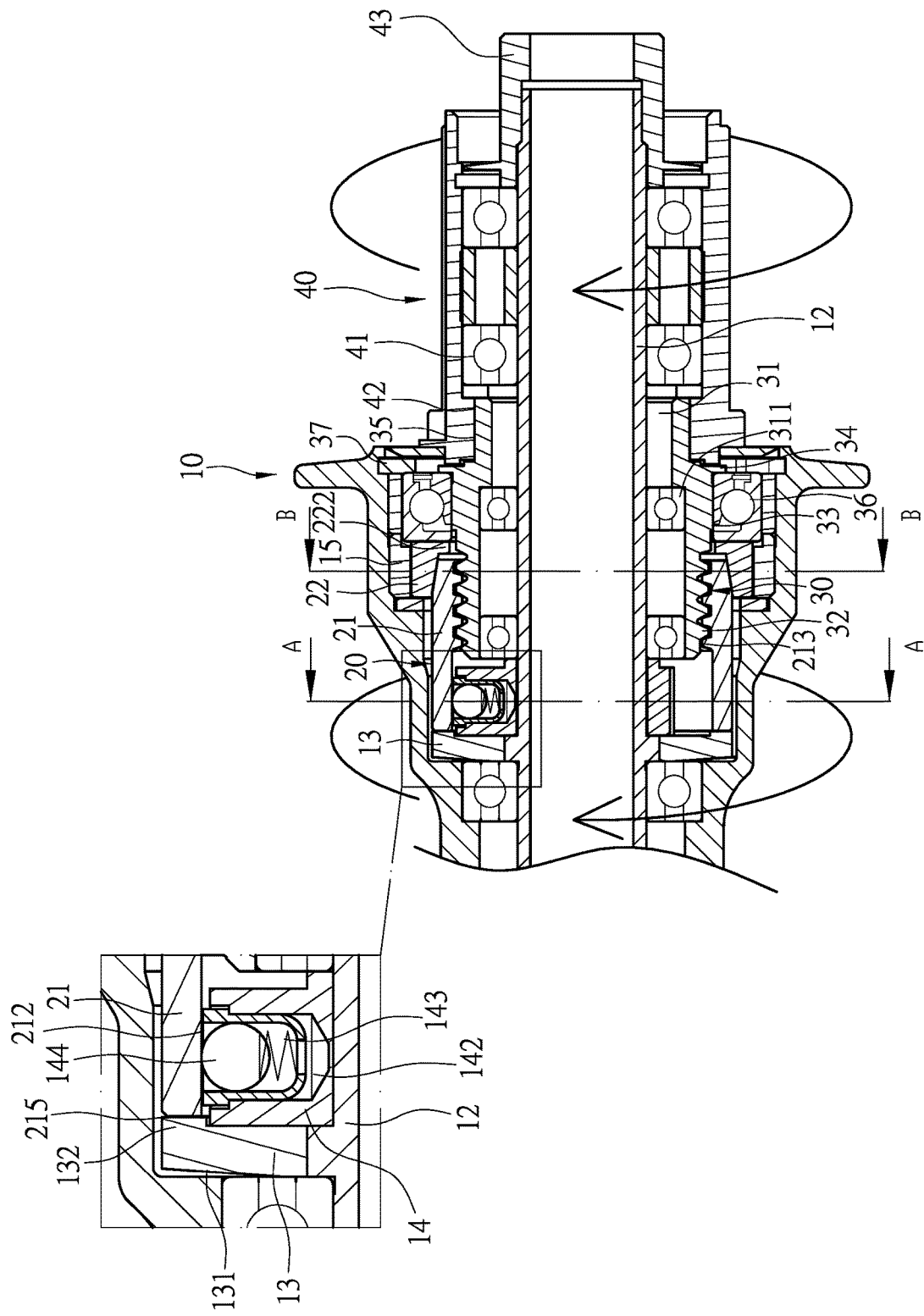
FIG. 3 is a cross-sectional view and a partially enlarged schematic view of the clutch set in accordance the preferred embodiment of the present invention.
Figure 4:
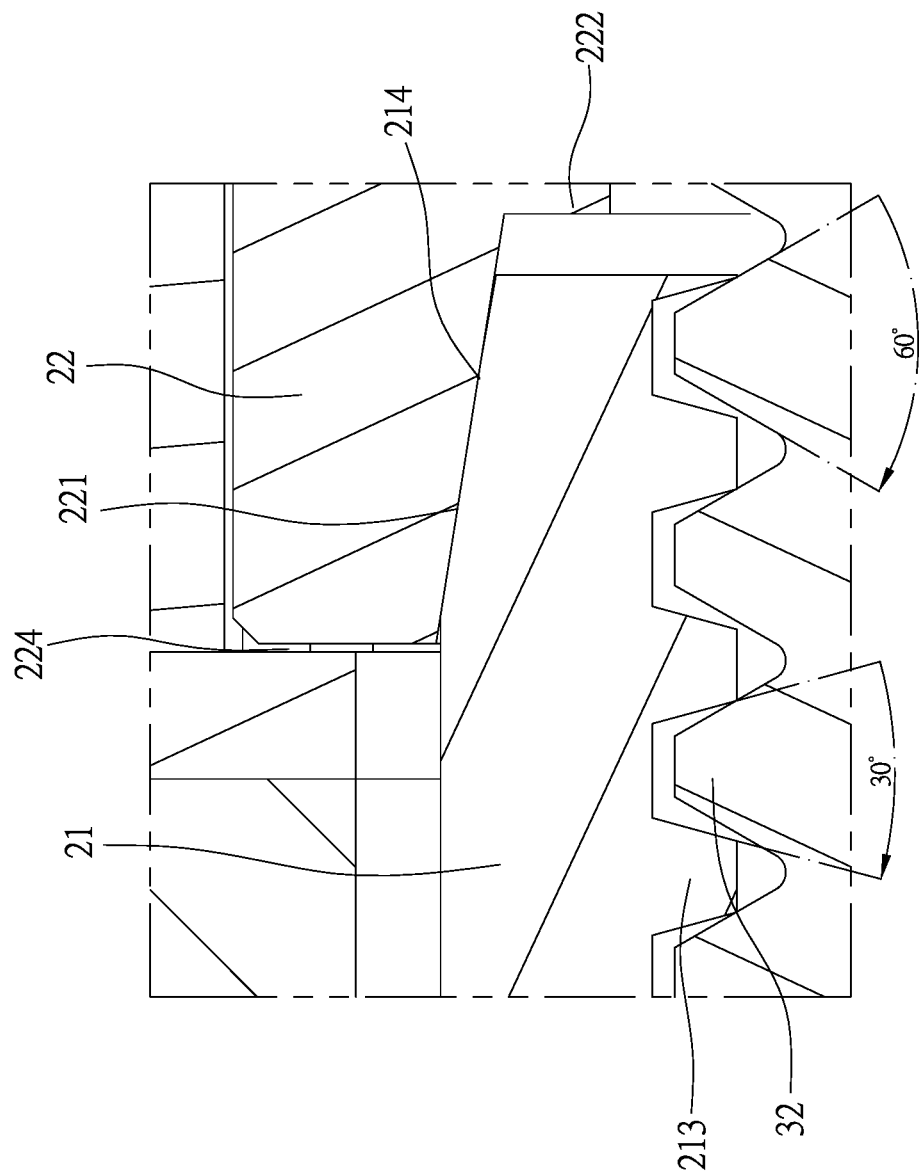
FIG. 4 is schematic drawing of the engagement of the driving central shaft and the driving base of the clutch set according to the present invention.
Figure 5:
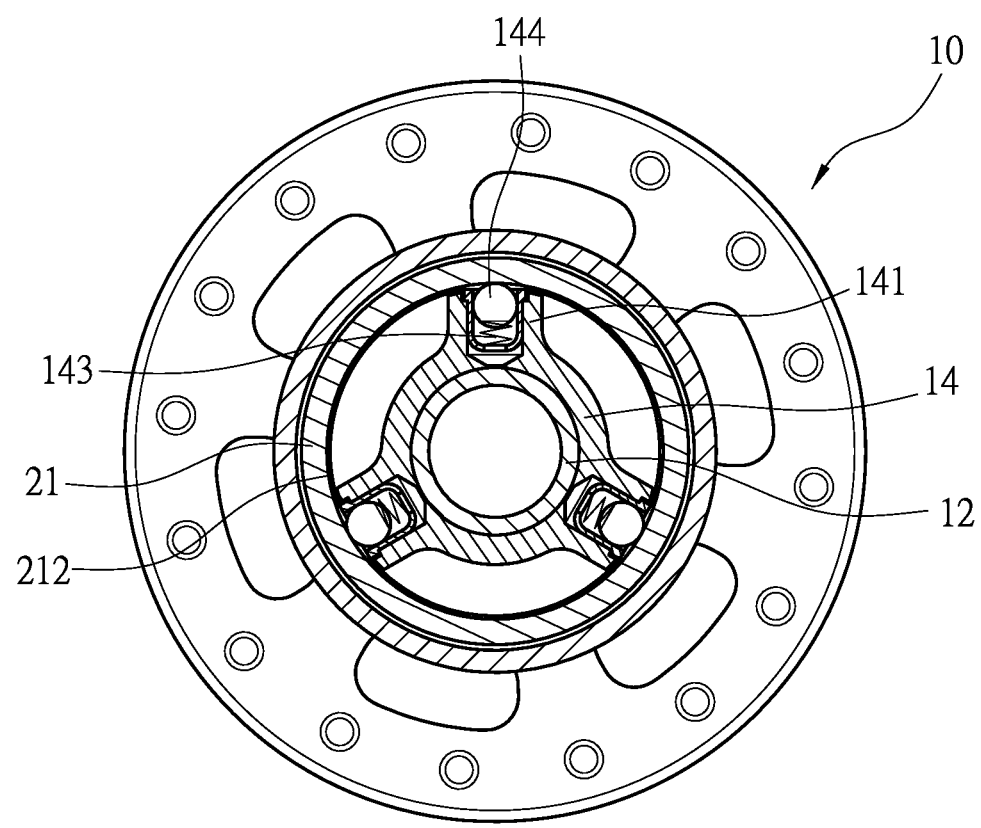
FIG. 5 is a cross-sectional view corresponding to sectional line A-A in FIG. 3 in accordance the preferred embodiment of the present invention.
Figure 6:
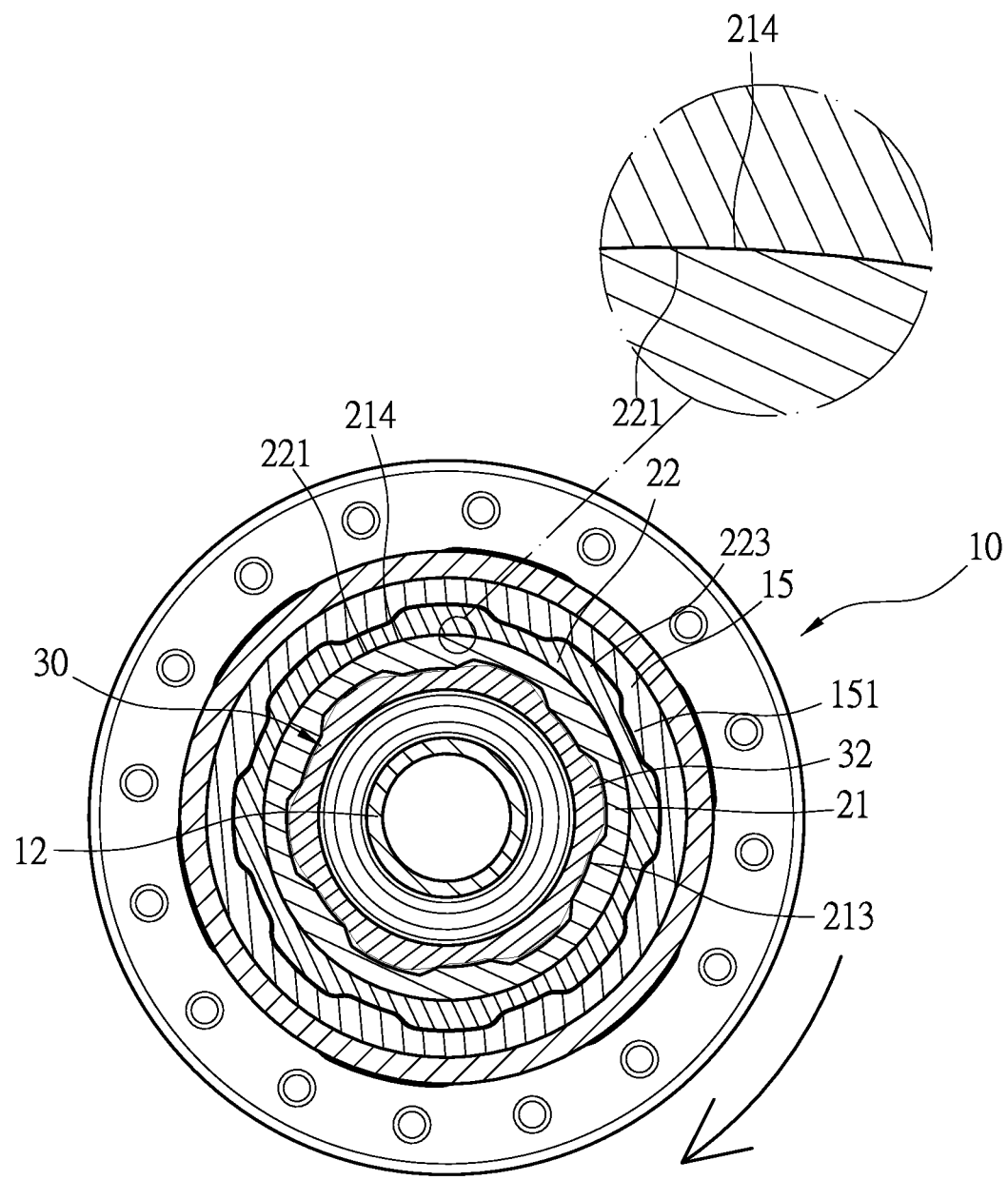
FIG. 6 is a sectional view of the clutch set corresponding to the sectional line B-B of FIG. 3 in accordance the preferred embodiment of the present invention.

Please refer to FIGS. 1, 2 and 3. A bicycle hub comprises a hub member 10, a clutch set 20, a driving base 30 and a sleeve 40. The hub member 10 has a chamber 11 and a mandrel 12 passing through the chamber 11. A fiber reinforced polymer baffle 13, a support base 14, and an internal toothed collar 15 are mounted in the chamber 11. A side of the fiber reinforced polymer baffle 13 has a circular bevel 131 disposed in the chamber 11, and another side of the fiber reinforced polymer baffle 13 has a circular protrusion 132. The support base 14 is slidingly engaged with the mandrel 12 and pushes against the fiber reinforced polymer baffle 13. The support base 14 has at least three protrusions 141, and each of the three protrusions 141 has a respective concave hole 142 provided with a spring 143 and a ball bearing 144. An outer periphery of the internal toothed collar 15 engages an inner wall of the chamber 11 and comprises a plurality of internal teeth 151 on an inner periphery thereof.

The clutch set 20 comprises a driving central shaft 21 and an external toothed coupling collar 22. The driving central shaft 21 comprises a shaft room 211 having a circular smooth section 212 and an inner threaded section 213. The circular smooth section is jacketed onto the support base 14 and pushed by the ball bearings 144. The driving central shaft 21 comprises a tapered abutment surface 214 at a front end thereof.

The external toothed coupling collar 22 comprises an inclined section 221 internally engaging with the tapered abutment surface 214 of the driving central shaft 21, and the inclined section of the external toothed coupling collar 221 further comprises a stopping loop 222 at a tapered end. The external toothed coupling collar 22 has a plurality of external teeth 223 engaging with the internal teeth 151 of the internal toothed collar 15.

The driving base 30 comprising an axial hole 31 configured to jacket onto the mandrel 12, and the axial hole 31 further has at least two bearing members 311 jacketed onto the mandrel. The driving base 30 has an outer threaded section 32, an engaging section 33, a stopping ring 34, and an engaging protrusion 35. The driving base 30 further includes a beveled bearing 36, and a C shaped buckle 37. A thread angle of the outer threaded section 32 is greater than a thread angle of the inner threaded section 213. The engaging section 33 is jacketed by the beveled bearing 36 and positioned by the stopping ring 34. The driving base 30 is disposed in the chamber 11 of the hub member 10, and an outer periphery of the beveled bearing 36 engages an inner periphery of the chamber 11. The outer threaded section 32 engages with the inner threaded section 213 of the driving central shaft 21, and the C-shaped buckle 37 pushes against the beveled bearing 36 and fastens with the inner periphery of the chamber 11.

The sleeve 40 has at least two bearing members 41 jacketed onto the mandrel 12. The sleeve 40 has an engaging indentation 42 engaging with the engaging protrusion 35 of the driving base 30. An end of the mandrel 12 is further provided with an outer threaded section 121 for engaging with a cap 43 to position the sleeve 40.

The thread angle of the inner threaded section 213 of the driving central shaft 21 is between 25° and 35°, and the thread angle of the outer threaded section 32 of the driving base 30 is between 50° and 70°.

For the assembly of the structure, please refer to FIGS. 2, 3, 4, 5, and 6. The chamber 11 of the hub member 10 is inserted with the mandrel 12 and then the fiber reinforced polymer baffle 13 and the support base 14 are jacketed on the mandrel 12. The fiber reinforced polymer baffle 13 is pushed into the chamber 11 with the circular bevel 131 facing the inner wall of the chamber 11, and the support base 14 is tightly fixed on the mandrel 12 and pushes against the fiber reinforced polymer baffle 13. The internal toothed collar 15 is tightly fixed to the inner diameter of the chamber 11. The clutch set 20 is mounted into the chamber 11, the shaft room 211 of the driving central shaft 21 is jacketed on the support base 14, and the circular smooth section 212 is in-contact with and the ball bearings 144 of the support base 14. Furthermore, a gap 215 is maintained at an end of the driving central shaft 21 away from the fiber reinforced polymer baffle 13. The inclined section 221 of the external toothed coupling collar 22 is jacketed onto the tapered abutment surface 214 of the driving central shaft 21, and the external teeth 223 of the external toothed coupling collar 22 engage with the internal teeth 151 of the internal toothed collar 15. The external toothed coupling collar 22 maintains a gap 224 between the internal toothed ring 15 and the driving central shaft 21, so that the external toothed coupling collar 22 is capable of moving forward and backward to engage with the internal toothed collar 15. The engaging section 33 of the driving base 30 is provided with a beveled bearing 36. When the driving base 30 is mounted into the chamber 11, the axial hole 31 of the driving base 30 is paired with at least two bearing members 311 jacketing on the mandrel 12, and the outer threaded section 32 engages with the inner threaded section 213 of the driving central shaft 21. The beveled bearing 36 is tightly inserted into the chamber 11 and pushes against the end of the internal toothed collar 15. Furthermore, the C-shaped buckle 37 pushes against the beveled bearing 36 and is secured with the chamber 11 to allow the driving base 30 to be rotatably mounted in the chamber 11, which drives the driving central shaft 21 to engage with the external toothed coupling collar 22. The sleeve 40 is rotatably mounted on the mandrel 12 via the two bearing members 41, one end of the engaging indentation 42 is engaged with the driving protrusion 35 of the driving base 30, and finally the cap 43 is locked on the outer threaded section 121 at the end of the mandrel 12 to prevent the sleeve 40 from sliding out, to complete the bicycle hub assembly.

For the actual use of the structure, please refer to FIGS. 3 to 6. The hub structure of the present invention is suitable for road bikes and mountain bikes. The outer diameter of the sleeve 40 matches the flywheel of the bicycle, and the sleeve 40 rotates through the crank and pedal rotation. When the pedal is stepped forward to drive the bicycle forward, the driving base 30 drives the inner threaded section 213 of the driving central shaft 21 through the outer threaded section 32. Since the thread angle of the outer threaded section 32 is greater than the thread angle of the inner threaded section 213, the outer threaded section 32 and the inner threaded section 213 are not fully engaged and locked, and only through point-to-surface contact transmission to instantly drive the driving the central shaft 21 to move to the direction of the external toothed coupling collar 22, to achieve the purpose of quickly coupling the driving central shaft 21 with the driving base 30. Furthermore, the tapered abutment surface 214 at the end of the external toothed coupling collar 22 is tightly combined with the inclined section 221 of the external toothed coupling collar 22, and the engagement between the external toothed coupling collar 22 and the internal tooth ring sleeve 15, so that the power received by the driving base 30 is transmitted to the hub member 10 for synchronous rotation.

Figure 7:
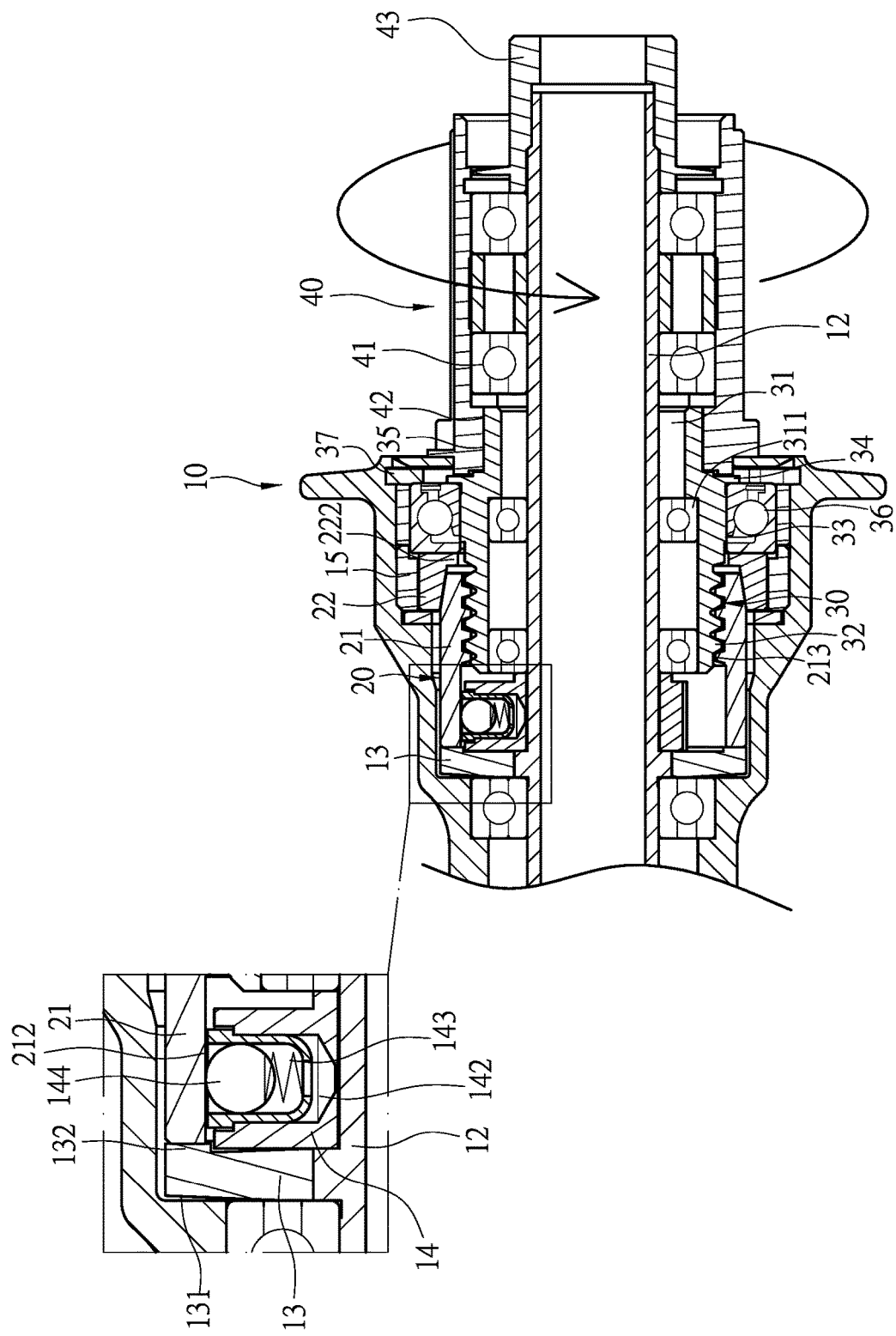
FIG. 7 is a cross-sectional view and partially enlarged schematic view of the disengagement of the clutch set in accordance the preferred embodiment of the present invention.
Figure 8:
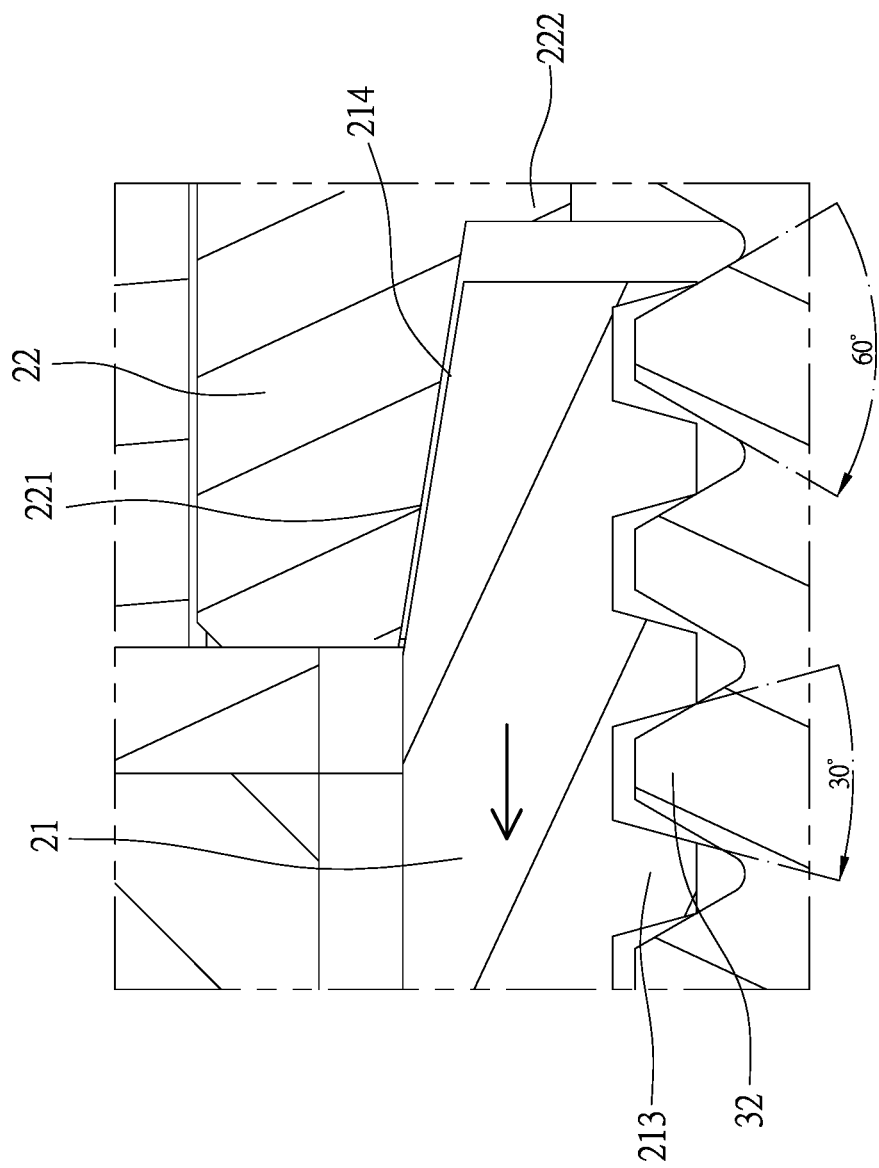
FIG. 8 is a schematic drawing of the driving central shaft and the driving base when the clutch set is disengaged in accordance the preferred embodiment of the present invention.
Figure 9:
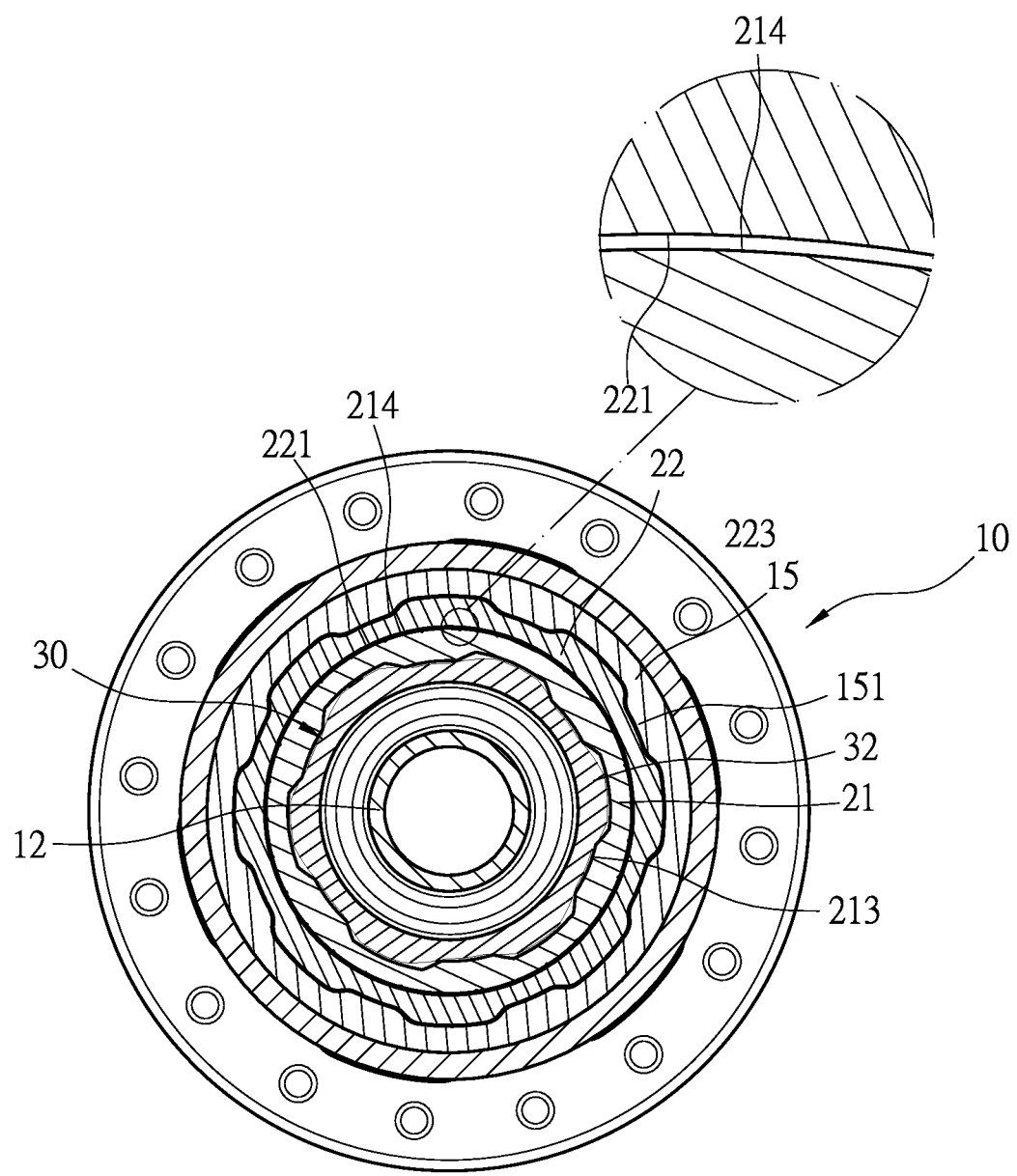
FIG. 9 is another angle cross-sectional view showing the clutch set being disengaged in accordance the preferred embodiment of the present invention.

On the contrary, when stepping is stopped, please refer to FIGS. 7, 8, and 9, the driving base 30 and the driving central shaft 21 are stationary due to the sleeve 40 is stopped, and the internal toothed collar 15 and the external toothed coupling collar 22 continue to rotate as the hub member 10 keeps sliding. At this time, because the driving central shaft 21 has stopped rotating, the external toothed coupling collar 22 moves along the gap 224 to push against the driving central shaft 21, so that the driving central shaft 21 moves along the gap 215 to move toward the fiber reinforced polymer baffle 13 and exit. Furthermore, the driving central shaft 21 of the tapered abutment surface 214 detaches from the inclined section 221 of the external toothed coupling collar 22, and the clutch set 20 of the driving central shaft 21 to be separated from the external toothed coupling collar 22 instantly, so the hub member 10 starts idling state and still glide smoothly.

In addition, the damping effect generated by the steel ball 144 of the support base 14 contacting the inner wall of the driving central shaft 21 allows the driving central shaft 21 to be separated from the external toothed coupling collar 22 to be temporarily fixed with the mandrel 12 which requires a certain amount of rotational force to turn, so that the driving central shaft 21 is not easily turned and forms an engagement state with the external toothed coupling collar 22.

Furthermore, when the bicycle is pedaled and rotated again the sleeve 40 continues to slide to slide, the driving base 30 instantly drives the driving central shaft 21 to move toward the external toothed coupling collar 22 and make the tapered abutment surface 214 at the end to be coupled with the inclined section 221 of the external toothed coupling collar 22 again to drive the hub member 10 to rotate.

Figure 10:
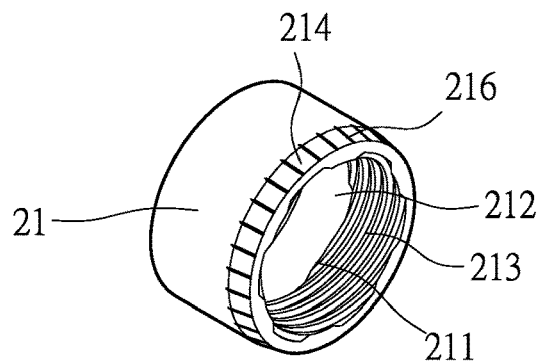
FIG. 10 is showing another embodiment of the driving central shaft of the present invention.
Figure 11:
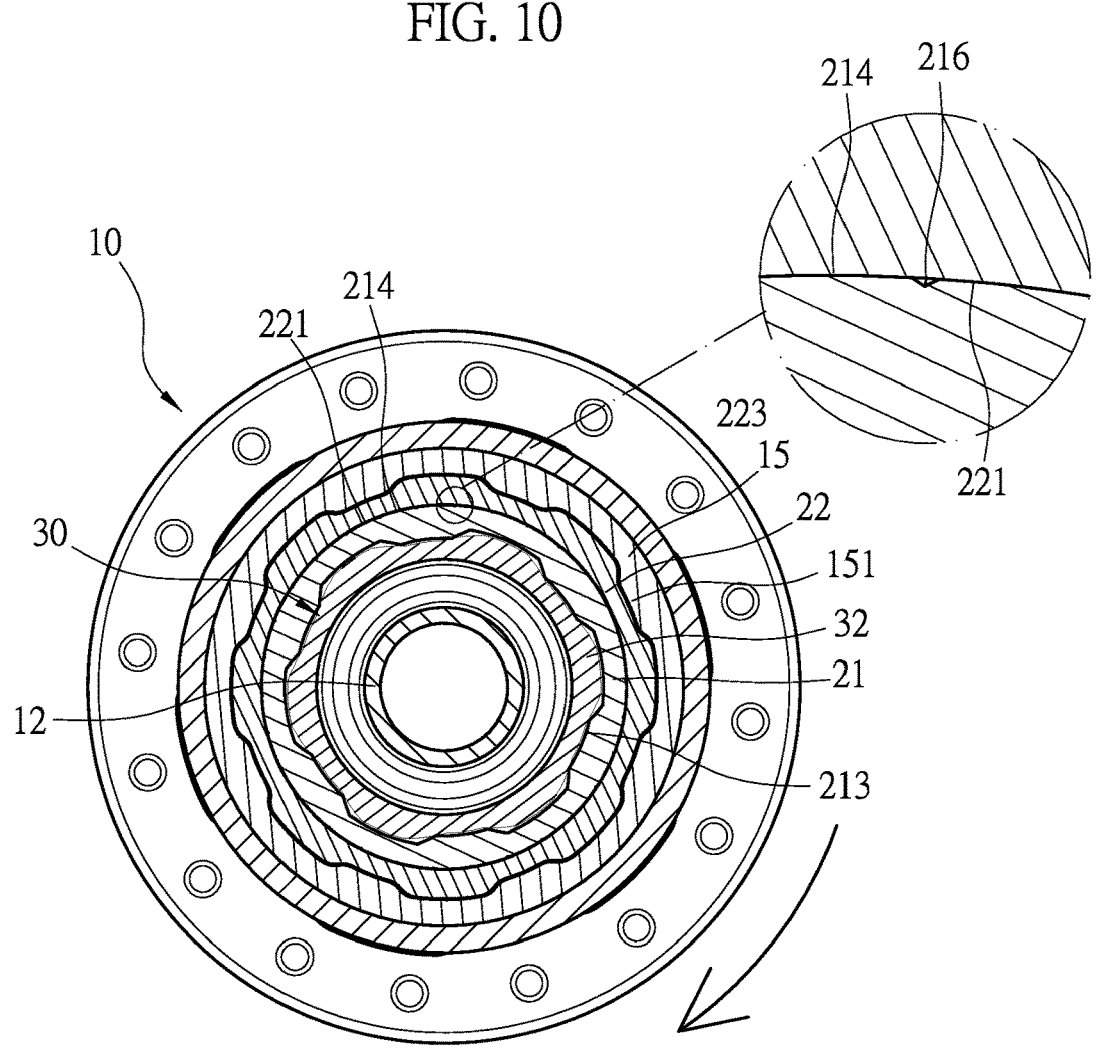
FIG. 11 is a cross-sectional view showing another embodiment of the driving central shaft of the present invention.

For another embodiment of the structure, please refer to FIG. 10 and FIG. 11, the driving central shaft 21 is further provided with a plurality of the ribs 216 on the tapered abutment surface 214, which can effectively improve the contact force and counteracting force between the tapered abutment surface 214 and the external toothed coupling collar 22.

According to the structures of the above specific embodiments, the following benefits can be obtained: the thread angle of the outer threaded section 32 of the driving base 30 is greater than the thread angle of the inner threaded section 213 of the driving central shaft 21, when the driving base 30 rotates, through the angle difference between the outer threaded section 32 and the inner threaded section 213, the contact between the point and the surface produces a displacement, which causes a temporary static pressure, so that the driving central shaft 21 and the external toothed coupling collar 22 have a coupling state instantly which greatly reduces the actuation stroke of the clutch set 20, improves the smoothness of driving and the sensitivity of the hub member 10.

Moreover, the external toothed coupling collar 22 provides the gap 224 between the internal tooth ring sleeve 15 and the driving central shaft 21, when the driving base 30 and the hub member 10 form an asynchronous action, the external toothed coupling collar 22 loosen the driving central shaft 21 by moving the gap 224, and the gap 215 of the driving central shaft 21 helps the fiber reinforced polymer baffle 13 to disengage, so the tapered abutment surface 214 of the driving central shaft 21 moves away from the inclined section 221 of the external toothed coupling collar 22 and allows the clutch set to break away instantly.

Furthermore, the support base 14 utilizes the plurality of the springs 143 to push the plurality of the steel balls 144 to make frictional contact with the circular smooth section 212 of the driving central shaft 21, so that the driving central shaft 21 provides a damping effect. When the driving central shaft 21 detaches from the external toothed coupling collar 22, it is subject to frictional limitation from the support base 14 to avoid the external toothed coupling collar 22 from contacting and easy engagement, which helps ensure the detachment between the driving central shaft 21 and the external toothed coupling collar 22.

Although the present invention has been explained in relation to its preferred embodiment, it is to be understood that many other possible modifications and variations can be made without departing from the spirit and scope of invention as hereinafter claimed.

What is claimed is:

1. A bicycle hub structure comprising:
a hub member having a chamber and a mandrel passing through the chamber;
a fiber reinforced polymer baffle;
a support base and an internal toothed collar disposed in the chamber, the fiber reinforced polymer baffle jacketed on the mandrel and pushing against an end of the chamber, the support base slidingly engaged with the mandrel and pushing against the fiber reinforced polymer baffle, the support base comprising a plurality of concave holes on a peripheral edge thereof, each concave hole comprising a spring and a ball bearing, an outer periphery of the internal toothed collar engaging an inner wall of the chamber and comprising a plurality of internal teeth on an inner periphery thereof;
a clutch set having a driving central shaft and an external toothed coupling collar, the driving central shaft comprising a shaft room having a circular smooth section and an inner threaded section, the circular smooth section jacketed onto the support base and pushed by the ball bearings, the driving central shaft spaced from the fiber reinforced polymer baffle, the driving central shaft comprising a tapered abutment surface at a front end thereof, the external toothed coupling collar comprising an inclined section engaging with the tapered abutment surface of the driving central shaft, and the external toothed coupling collar having a plurality of external teeth engaging with the internal teeth of the internal toothed collar;
a driving base comprising an axial hole configured to jacket onto the mandrel, the driving base having an outer threaded section, an engaging section, a stopping ring, an engaging protrusion and a C-shaped buckle, and the engaging section jacketed by a beveled bearing and disposed in the chamber of the hub member, an outer periphery of the beveled bearing engaging an inner periphery of the chamber, the outer threaded section engaging the inner threaded section of the driving central shaft, and a thread angle of the outer threaded section being greater than a thread angle of the inner threaded section, the C-shaped buckle pushing against the beveled bearing and fastening with the inner periphery of the chamber; and
a sleeve jacketed onto the mandrel and having an engaging indentation engaging with the engaging protrusion of the driving base to control a clutch engagement between the driving central shaft and the external toothed coupling collar to rotate the hub member.

2. The bicycle hub structure as claimed in claim 1, wherein a side of the fiber reinforced polymer baffle has a circular bevel facing the end of the chamber, and another side of the fiber reinforced polymer baffle has a circular protrusion facing away from the end of the chamber.

3. The bicycle hub structure as claimed in claim 1, wherein the thread angle of the inner threaded section of the driving central shaft is between 25° and 35°, and the thread angle of the outer threaded section of the driving base is between 50° and 70°.

4. The bicycle hub structure as claimed in claim 1, wherein the outer periphery of the support base has at least three protrusions, and each of three protrusions has a respective concave hole provided with a spring and a ball bearing.

5. The bicycle hub structure as claimed in claim 1, wherein the tapered abutment surface of the driving central shaft further has a plurality of ribs.

6. The bicycle hub structure as claimed in claim 1, wherein the inclined section of the external toothed coupling collar further comprises a stopping loop at an end of the external toothed coupling collar.

7. The bicycle hub structure as claimed in claim 1, wherein the sleeve further has at least two bearing members jacketed onto the mandrel.

8. The bicycle hub structure as claimed in claim 1, wherein an end of the mandrel is further provided with an outer threaded section for engaging with a cap to position the sleeve.

* * * * *